United States Patent
Patrick

(10) Patent No.: US 7,610,618 B2
(45) Date of Patent: Oct. 27, 2009

(54) SYSTEM AND METHOD FOR AUTHENTICATING A SUBJECT

(75) Inventor: Paul Patrick, Manchester, NH (US)

(73) Assignee: BEA Systems, Inc., Redwood Shores, CA (US)

( * ) Notice: Subject to any disclaimer, the term of this patent is extended or adjusted under 35 U.S.C. 154(b) by 18 days.

(21) Appl. No.: 10/373,533

(22) Filed: Feb. 24, 2003

(65) Prior Publication Data

US 2004/0168060 A1    Aug. 26, 2004

(51) Int. Cl.
H04L 29/00 (2006.01)

(52) U.S. Cl. .......................................... 726/7

(58) Field of Classification Search ........... 713/168–76, 713/181, 183, 185–6; 709/219, 227, 229
See application file for complete search history.

(56) References Cited

U.S. PATENT DOCUMENTS

| | | | |
|---|---|---|---|
| 5,341,478 A | 8/1994 | Travis, Jr. et al. ............ 395/200 |
| 5,619,710 A | 4/1997 | Travis, Jr. et al. ............ 395/800 |
| 5,925,126 A | 7/1999 | Hsieh | |
| 6,308,163 B1 | 10/2001 | Du et al. ........................ 705/8 |
| 6,353,891 B1* | 3/2002 | Borella et al. ............... 713/201 |
| 6,490,624 B1* | 12/2002 | Sampson et al. ............ 709/227 |
| 6,571,247 B1 | 5/2003 | Danno et al. ................ 707/100 |
| 6,618,806 B1 | 9/2003 | Brown et al. | |
| 6,651,168 B1* | 11/2003 | Kao et al. .................... 713/185 |
| 6,668,327 B1* | 12/2003 | Prabandham et al. ....... 713/201 |
| 6,711,681 B1* | 3/2004 | Al-Salqan et al. ........... 713/184 |
| 6,836,845 B1* | 12/2004 | Lennie et al. ................ 713/181 |
| 6,877,095 B1 | 4/2005 | Allen | |
| 6,892,307 B1* | 5/2005 | Wood et al. .................. 713/201 |
| 6,944,761 B2* | 9/2005 | Wood et al. .................. 713/155 |
| 6,976,076 B2* | 12/2005 | Shrader et al. .............. 709/228 |
| 6,985,953 B1* | 1/2006 | Sandhu et al. .............. 709/229 |
| 7,089,584 B1* | 8/2006 | Sharma ......................... 726/4 |
| 2002/0091798 A1* | 7/2002 | Joshi et al. ................... 709/219 |
| 2002/0188869 A1 | 12/2002 | Patrick | |
| 2003/0005118 A1* | 1/2003 | Williams .................... 709/225 |
| 2003/0005331 A1 | 1/2003 | Williams | |
| 2003/0051142 A1* | 3/2003 | Hidalgo et al. .............. 713/176 |
| 2003/0097574 A1 | 5/2003 | Upton | |
| 2003/0131113 A1 | 7/2003 | Reeves et al. ............... 709/229 |
| 2003/0177388 A1 | 9/2003 | Botz et al. | |
| 2003/0229623 A1 | 12/2003 | Chang et al. ................... 707/3 |
| 2004/0117486 A1* | 6/2004 | Bourne et al. ............... 709/228 |

OTHER PUBLICATIONS

Coulouris et al., "Distributed Systems: Concepts And Design", Aug. 2000, Addison-Wesley, 3$^{rd}$ Edition, pp. 138-145.*

(Continued)

Primary Examiner—Minh Dinh
(74) Attorney, Agent, or Firm—Fliesler Meyer LLP

(57) ABSTRACT

A method for adaptively authenticating a subject based on authentication information, comprising the steps of providing for the receipt of the authentication information; providing for the performance of Java Authentication and Authorization Service (JAAS) authentication of the subject based on the authentication information and wherein successful authentication of the subject results in the association of a principal with the subject; providing for the signing of the principal by determining an authentication code for the principal that is a function of the principal and a key.

25 Claims, 7 Drawing Sheets

OTHER PUBLICATIONS

Bowker, "Superior app management with JMX", JavaWorld.com, Jun. 2001, Retrieved from the Internet on Jan. 9, 2008: <URL: http://www.javaworld.com/javaworld/jw-06-2001/jw-0608-jmx.html>.*

Oaks, "Java Security", May 2001, O'Reilly, $2^{nd}$ Edition, pp. 362-368.*

BEA WebLogic Server 7.0—Creating Custom Authentication Providers, BEA Systems, May 2002, Retrieved from the Internet on Jun. 11, 2009: <URL: http://web.archive.org/web/20020528085707/edocs.bea.com/wls/docs70/dvspisec/atn.html>.*

WebLogic Server 6.1—Introduction to WebLogic Security, BEA Systems, 2001, Retrieved from the Internet on Jun. 11, 2009: <URL: http://edocs.bea.com/wls/docs61/security/intro.html>.*

U.S. Appl. No. 10/373,532, filed Feb. 24, 2003, Paul Patrick.

Bellare et al., *Message Authentication using Hash Functions—The HMAC Construction, RSA Laboratories CryptoBytes*, vol. 2, No. 1, Spring 1996, pp. 1-5.

Java Management Extensions (JMX)., *Cross-Industry Management Through Java Technology, Sun Microsystems, Inc.*, Jun. 1999, 2 pages.

Java Management Extensions White Paper, *Dynamic Management for the Service Age, Sun Microsystems, Inc.*, Jun. 1999, pp. 1-13.

BEA Weblogic Server, *Programming Weblogic Management Services with JMX, BEA Systems, Release* 7.0, Revised: Aug. 23, 2002, 115 pages.

BEA Weblogic Server, *Introduction to Weblogic Security, BEA Systems*, Release 7.0, Document Date: Jun. 2002, Revised: Jun. 28, 2002, 22 pages.

BEA Weblogic Server, *Programming WebLogic Security, BEA Systems*, Release 7.0, Document Date: Jun. 2002, Revised: Sep. 6, 2002, 104 pages.

BEA WebLogic Server, *Developing Security Providers for WebLogic Server, BEA Systems, Release* 7.0, Document Revised: Aug. 30, 2002, 315 pages.

Lai, C., et al., "User Authentication and Authorization in the Java (TM) Platform," *Published in the Proceedings of the $15^{th}$ Annual Computer Security Applications Conference*, Phoenix, Arizona, Dec. 1999, 10 pages.

Samar, V., et al., "Making Login Services Independent of Authentication Technologies," $3^{rd}$ *ACM Conference on Computer and Communications Security*, Mar. 1996, 10 pages.

* cited by examiner

SYSTEM AND METHOD FOR AUTHENTICATING A SUBJECT

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

CROSS REFERENCES

This application is related to the following co-pending application which is hereby incorporated by reference in its entirety: SYSTEM AND METHOD FOR ENTERPRISE AUTHENTICATION, U.S. patent application Ser. No. 10/373,532, Inventor: Paul Patrick, filed on Feb. 24, 2003 and issued as U.S. Pat. No. 7,017,051 on Mar. 21, 2006.

This application is related to the following publications which are each hereby incorporated by reference in their entirety: *BEA WebLogic Server™: Developing Security Providers for WebLogic Server* (Release 7.0, Aug. 30, 2002); *BEA WebLogic Server™: Introduction to WebLogic Security* (Release 7.0, Jun. 28, 2002).

FIELD OF THE DISCLOSURE

The present invention disclosure relates to enterprise authentication, and in particular, the Java™ Authentication and Authorization Service.

BACKGROUND

Heterogeneous computer systems typically require multiple authentication mechanisms. For example, in order to access a particular enterprise application, a user may have to login to their workstation, a network, and finally the application itself. This process is cumbersome since it requires the user to interact with different authentication mechanisms, each of which may require the user to remember a unique user name and password. An additional drawback is that each authentication mechanism may be tightly integrated with the mechanism used to obtain authentication information from the user. This merger of the two mechanisms makes it difficult to integrate new authentication techniques.

DETAILED DESCRIPTION

The invention is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
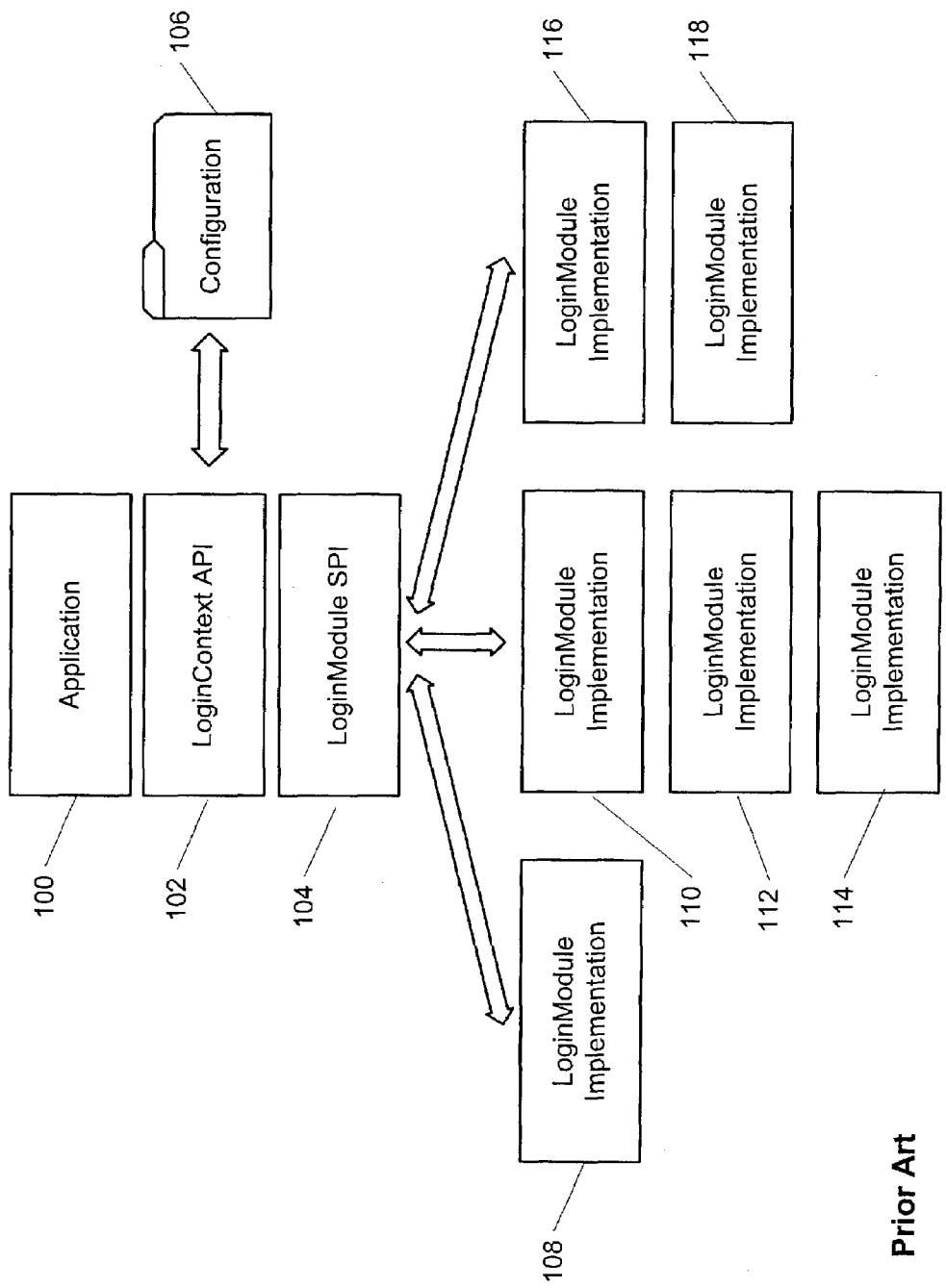
FIG. 1 is an illustration of an Authentication portion of the Java™ Authentication and Authorization Service.

FIG. 1 is an illustration of the authentication portion of the Java™ Authentication and Authorization Service (JAAS). Although this figure depicts objects as functionally separate, such depiction is merely for illustrative purposes. It will be apparent to those skilled in the art that the objects portrayed in this figure can be arbitrarily combined or divided into separate software, firmware or hardware components. Furthermore, it will also be apparent to those skilled in the art that such components, irregardless of how they are combined or divided, can execute on the same computer or can be arbitrarily distributed among different computers which may be connected by one or more networks.

JAAS is a component of the Java™ programming language environment and is available from Sun Microsystems, Inc. of Santa Clara, Calif. In one embodiment, JAAS can be used to authenticate users. JAAS implements a modular authentication framework where applications or processes requiring authentication services are kept logically separate from those services. This permits changes to authentication technologies without requiring in kind modifications to applications or processes.

Referring to FIG. 1, JAAS authentication is comprised of a LoginContext application programming interface (API) front-end 102 and a back-end including one or more authentication (or login) modules 108-118, connected via a LoginModule service provider interface (SPI) 104. In one embodiment, an interface can be a convention for communication between software and/or hardware components. In another embodiment, an interface can be a class definition in an objected oriented programming language, such as Java™. An application program/process 100 can access authentication services through the API 102 while authentication module providers write to (or "plug" into) the application-independent SPI 104. In one embodiment, API 102 and SPI 104 can be implemented as the following Java™ classes:

```
public final class LoginContext {
    public LoginContext(String name) { }
    public void login( ) { }
    public void logout( ) { }
    public Subject getSubject( ) { }
}
public interface LoginModule {
    boolean login( );
    boolean commit( );
    boolean abort( );
    boolean logout( );
}
```

An application invokes the LoginContext's login method to request authentication of a subject. By way of a non-limiting example, in one embodiment a subject can refer to a user (be it an individual user or a group) or a service/process. One or more principals are associated with a subject upon its successful authentication. A principal can be a name or identity associated with a subject that can be used to identify the subject.

LoginContext 102 can consult configuration 106 to determine which specific login modules 110-118 to invoke in performing authentication of a subject. Depending on the requirements of a particular login module, different types of proof (e.g., user name, password, biometric data such as a finger print, retina scan, voice print, etc.) may be required for authentication. In some cases, a login module must communicate with the source of an authentication request to obtain such information. In one embodiment, a JAAS CallbackHandler interface (not shown) can be used to provide this information in an application independent fashion. For example, application 100 can implement the CallbackHandler interface and provide it to each login module via the LoginContext 102. Login modules can thereafter use the CallbackHandler to gather any required proof from the application.

The configuration 106 for a given application 100 can specify which login modules are required and which are optional. The required and optional login modules for a given application comprise an authentication stack. Stacking allows multiple authentication mechanisms to be supported (e.g., in a heterogeneous environment). Referring to FIG. 1, one stack is comprised of modules 110-114 and another is comprised of modules 116 and 118. By way of a non-limiting illustration, module 110 may authenticate a subject for a given workstation, module 112 may authenticate the subject for a given network, and finally module 114 may authenticate the subject for an enterprise application. In this example, configuration 106 would specify that all three are required for application 100. Upon successful authentication, each login module associates one or more principals with the subject.

In one embodiment, the login method of the LoginContext can perform multiple authentication in two phases. In the first phase, each login module is invoked to perform authentication of the subject. If the required login modules succeed in authentication, the second phase invokes each login module's commit method causing any relevant principals to be associated with the subject. In one embodiment, if either phase fails, the LoginContext can invoke the abort method for each login module and thus roll back the authentication.

Figure 2:
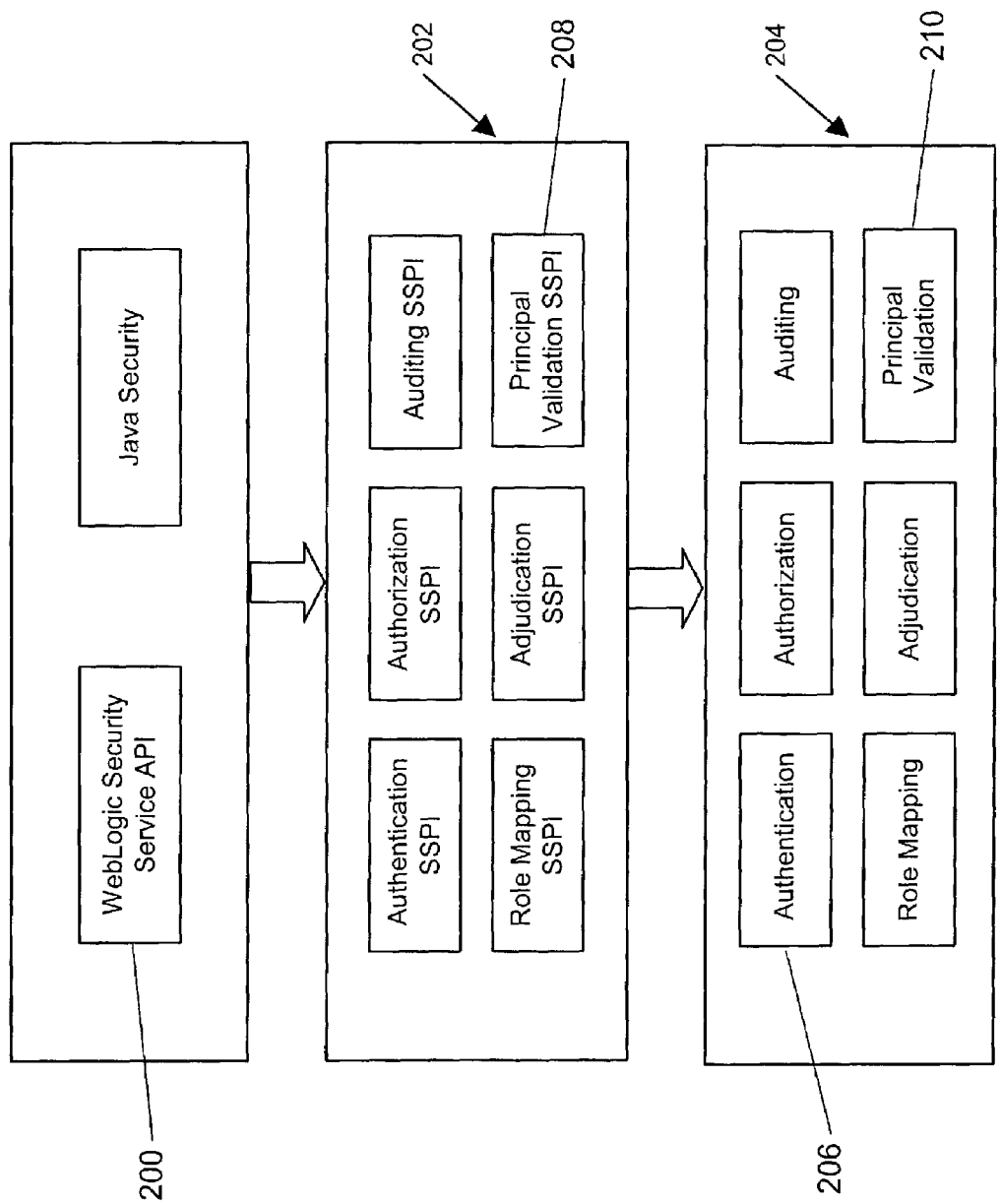
FIG. 2 illustrates the architecture of the WebLogic® Security Service in one embodiment of the invention.

FIG. 2 illustrates the architecture of the WebLogic® Security Service (WLSS) in one embodiment of the invention. The WLSS is a component of the WebLogic® Server, available from BEA Systems, Inc. of San Jose, Calif. The WLSS provides container support for JAAS and permits the use of JAAS authentication in application code through an API 200. In one embodiment, a container provides a standard set of services (e.g., caching, concurrency, persistence, security, transaction management, locking, environment, memory replication, environment, clustering, etc.) for the entity objects that live in the container (e.g., Java™ Beans).

The WLSS framework is not limited to authentication. It has an open, general-purpose architecture that allows security vendors to provide new services (e.g., authorization, role mapping, auditing, principal validation, etc.) that plug into WLSS through a set of Security Service Provider Interfaces (SSPI's) 202. In one embodiment, SSPI's are available for Authentication, Authorization, Auditing, Role Mapping, Keystore and Principal Validation. WLSS also includes default security provider implementations 204 for these SSPI's, including JAAS-based Authentication 206 and Principal Validation 210. In one embodiment, an interface can be implemented in the Java™ programming language or other paradigms that support inheritance of interfaces.

To provide open and extensible management of security services, in one embodiment WLSS implements Java™ Management Extensions (JMX). JMX was developed by Sun Microsystems, Inc. and other companies. JMX provides a tiered architecture for integrating managed resources and the applications that manage them. Each managed resource includes a set of attributes that can be configured and monitored for management purposes. These attributes are exposed through one or more managed beans (MBeans). The bottom-most tier is the instrumentation level. It allows management of a resource through one or more MBeans. There is a direct mapping between Java™ Beans and MBeans, thus allowing for straightforward implementation of management capabilities if a resource happens to be a Java™ Bean. The middle tier is the agent level. Agents provide for communicating with one or more MBeans synchronously or asynchronously (e.g., polling). The upper-most tier is the management level. This level provides user-accessible management components and tools that consolidate the services of agents.

Figure 3:
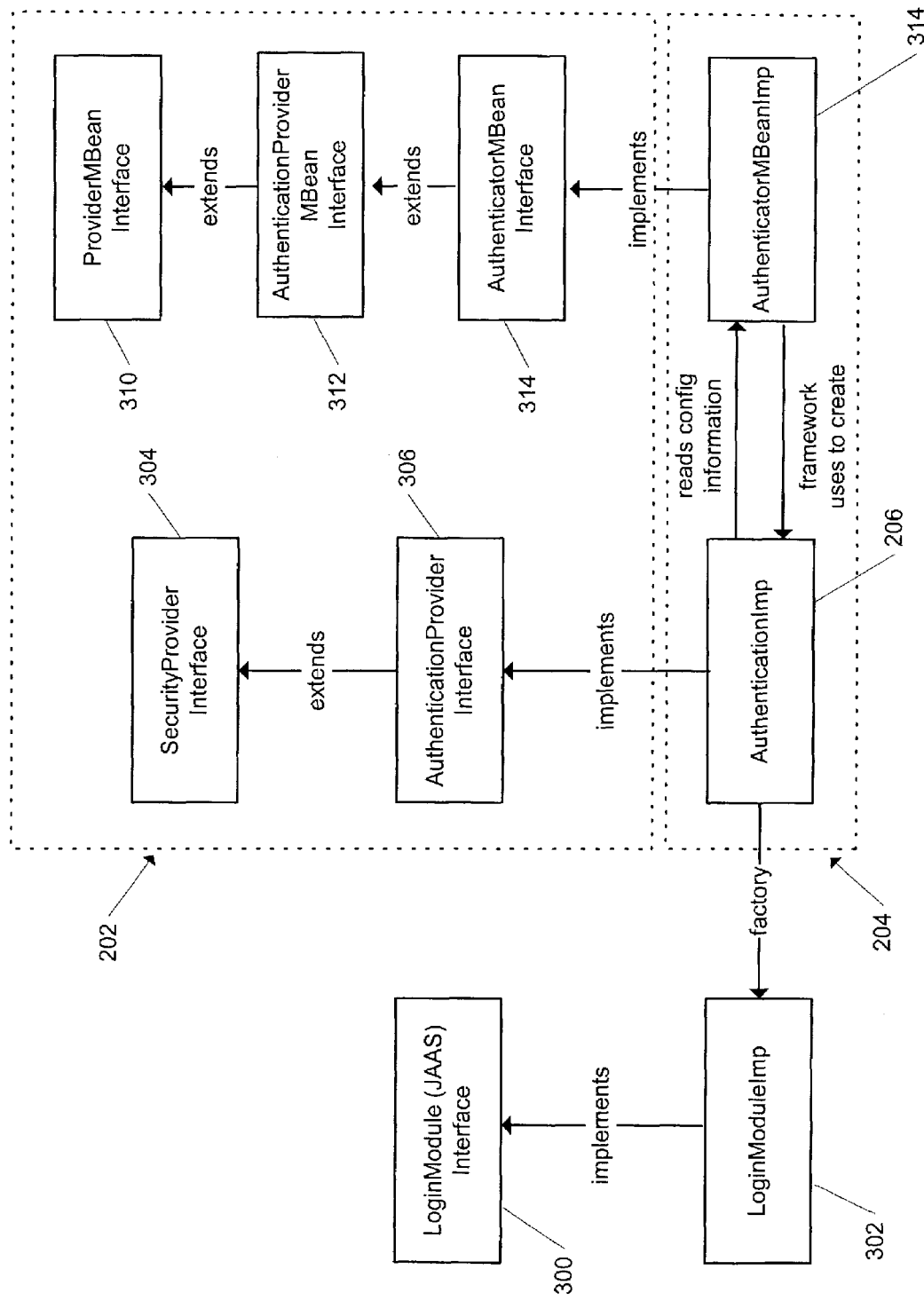
FIG. 3 illustrates the general class architecture of an authentication provider and its associated MBeans in one embodiment of the invention.

FIG. 3 illustrates the general class architecture of an authentication provider and its associated MBean in one embodiment of the invention. Generally speaking, implementing an authentication provider in the WLSS framework can include the following steps:

Determine the type of custom security provider to create (e.g., authentication).

Identify the appropriate SSPI's to implement in order to create the runtime class(es) for the security provider.

Identify the appropriate MBean SSPI's to implemented in order to manage the security provider run-time class.

Implement the SSPI's by providing implementations for each of their methods. The methods should contain specific algorithms for the security services offered by the security provider.

FIG. 3 illustrates the WLSS authentication SSPI's 202 and implementations thereof 204 in one embodiment. The SecurityProvider interface 304 is required of all security providers because it supplies fundamental methods for interaction with the WLSS framework. In one embodiment, the SecurityProvider includes the following methods:

| METHOD | DESCRIPTION |
| --- | --- |
| initialize (ProviderMBean) | Initializes the security provider. Takes as a parameter a ProviderMBean. This parameter allows the security provider to be managed in the WLSS framework by passing configuration information contained in the MBean to the provider. |
| GetDescription | Returns a text description of the security provider. For example, "WebLogic ® Authentication provider, version 1.0". |
| Shutdown | Terminates the security provider. |

The SecurityProvider interface 304 is extended by an AuthenticationProvider interface 306. The AuthenticationProvider interface exposes the services of an authentication provider implementation to the WLSS framework such that the authentication provider can be manipulated (e.g., initialized, started, stopped, etc.) by the framework. In one embodiment, the AuthenticationProvider interface includes the following methods:

| METHOD | DESCRIPTION |
| --- | --- |
| getLoginModule-Configuration | Returns the AppConfigurationEntry for this Authentication provider's JAAS LoginModule. The AppConfigurationEntry is a configuration specific to this Authentication provider that is needed to properly execute login authentication in a |

-continued

| METHOD | DESCRIPTION |
|---|---|
| | security realm. In one embodiment, a security realm contains a set of security configuration settings, including a set of security providers to use (for example, for authentication and authorization). The AppConfigurationEntry parameter represents a single LoginModule entry configured for an application. In one embodiment, each respective AppConfigurationEntry can contain a LoginModule name, a control flag (specifying whether this LoginModule is REQUIRED, REQUISITE, SUFFICIENT, or OPTIONAL), and LoginModule-specific options. |
| getPrincipal-Validator | Returns this Authentication provider's associated Principal Validation provider. The PrincipalValidator interface 208 defines the methods that custom Principal Validation providers can implement to support principal trust relationships within the context of the WLSS framework. In one embodiment, Principal Validation providers can be used with Authentication providers to provide additional security protections for the principals associated with a subject. |

In one embodiment, the SecurityProvider and AuthenticationProvider interfaces are implemented by an Authenticationimp class 206. In another embodiment, if there were additional SSPI's to implement (i.e., not in the SecurityProvider hierarchy), the Authenticationimp class could act as a factory for generating these. A factory allows objects to be created dynamically. For example, in one embodiment the AuthenticationProvider 206 can use a factory to instantiate a LoginModule object 302 that implements the JAAS LoginModule interface 300 and thereafter use the object to perform JAAS authentication.

In one embodiment, an MBean class can be implemented to manage the Authenticationimp class 206. The ProviderMBean interface 310 is the base MBean for all security managers and as such includes attributes common to all. All attributes and operations that are specified in an implemented MBean extend up the class hierarchy and are exposed in the ProviderMBean interface. This allows a JMX-compatible administrative tool to access and configure these attributes which in one embodiment are provided to the AuthenticationImp 206 via the initialize method of the SecurityProviderInterface. In one embodiment, the ProviderMBean has the following methods:

| METHOD | DESCRIPTION |
|---|---|
| getProvider-ClassName | Returns the name of the Java ™ class used to load the security provider. Each security provider can implement a runtime class which extends a specific interface in WLSS. The security provider's MBean can set the default value of this attribute to a fully qualified classname of the security provider's runtime class. |
| GetDescription | Returns a string that describes this security provider. Each security provider's MBean can set the default value of this attribute. |
| GetVersion | Returns the security provider's version. Each security provider's MBean can set the default value of this read-only attribute to a string that specifies the version of the provider (eg. 7.3.04). |
| getRealm | Returns the RealmMBean that contains this security provider. A RealmMBean is an MBean that represents configuration attributes for a security realm. A security realm contains a set of security configuration settings, |

-continued

| METHOD | DESCRIPTION |
|---|---|
| | including a set of security providers to use (for example, for authentication and authorization). When a WebLogic ® Server boots, it locates and uses a default security realm. If an application specifies a different security realm, then that security realm is used instead. |
| setRealm (RealmMBean) | Set the realm that contains this security provider. |

In one embodiment, the ProviderMBean interface 310 can be extended by the AuthenticationProviderMBean interface 312. The AuthenticationProviderMBean is the base MBean for all MBean implementations that manage Authentication providers. In one embodiment, the interface can be a marker, that is, it has no methods other than those it inherits from ProviderMBean. In another embodiment, the AuthenticationProviderMBean can supply methods specific to authentication providers.

In one embodiment, the AuthenticationProviderMBean interface 312 can be extended by the AuthenticatorMBean interface 314. The AuthenticatorMBean is the SSPI MBean that an authentication provider with login services can extend. This MBean provides a ControlFlag to determine whether the authentication provider is a required, requisite, sufficient or an optional part of a stacked login sequence. In one embodiment, the interface includes the following methods:

| METHOD | DESCRIPTION |
|---|---|
| GetControlFlag | Returns the control flag associated with this provider. The control flag determines how the framework uses the Authentication provider. A REQUIRED value requires this Authentication provider to succeed. Regardless of whether it succeeds, in one embodiment an authentication proceeds to other Authentication providers that have been configured as part of the login stack. A REQUISITE value requires this Authentication provider to succeed. If it succeeds, authentication proceeds to other Authentication providers. If it fails, control immediately returns to the application (authentication does not proceed). A SUFFICIENT value does not require this Authentication provider to succeed. If it succeeds, control immediately returns to the application (authentication does not proceed to other Authenticaion providers). If it fails, authentication proceeds to other Authentication providers that have been configured as part of the login sequence. An OPTIONAL value does not require this Authentication provider to succeed. Regardless of whether it succeeds, in one embodiment authentication proceeds to other Authentication providers that have been configured as part of the login sequence. |
| setControlFlag (integer) | Determines how the login sequence uses the Authentication provider. |

AuthenticatorMBeanImp 314 implements the AuthenticatorMBean interface. AuthenticationImp 206 and AuthenticatorMBeanImp 314 are run-time security provider implementations of their respective interface hierarchies. Together, both the runtime class and its associated MBean form a "security provider." In one embodiment, when a WebLogic® Server instance starts, the WLSS framework locates the MBean (AuthenticatorMBeanImp 314) associated with the security provider (AuthenticationImp 206). The framework provides the AuthenticatorMBeanImp 314 to an instance of the security provider AuthenticationImp 206, which uses the MBean to obtain its configuration information. In another embodiment, configuration information could be obtained from another source (e.g., a database, file or a process).

Figure 4:
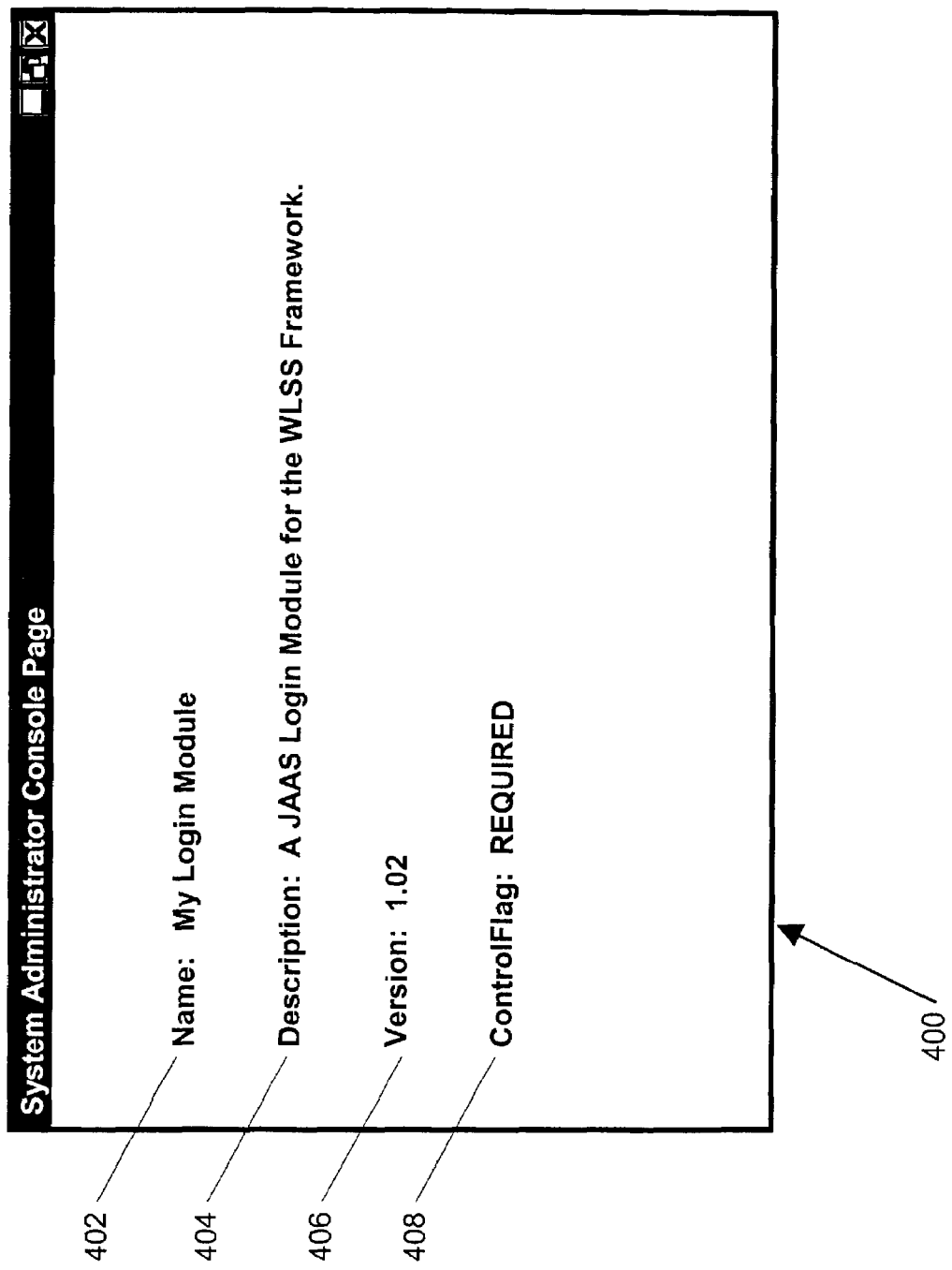
FIG. 4 is an exemplary administrative tool in one embodiment of the invention.

FIG. 4 is an exemplary administrative tool in one embodiment of the invention. By way of illustration, the tool can logically reside at the JMX management level and can include a graphical user interface 400. In one embodiment, all attributes and operations that are specified in the classes hierarchically beneath the ProviderMBean interface can be automatically surfaced in the administrative tool 400 wherein they may be configured. For example, the Name 402, Description 404, and Version 406 fields come from attributes inherited from the ProviderMBean interface 310, whereas the ControlFlag 408 comes from the AuthenticatorMBean interface 314. Access to these attributes by an administrative tool allows the Authenticationimp class 206 to be easily configured.

Authentication providers also remember, transport, and make identity information available to various components of a system (via subjects) when needed. JAAS utilizes subjects as containers for authentication information, including principals. During the authentication process, a principal validation provider 210 affords additional security protection for principals associated with a subject by signing and verifying the authenticity of those principals. In one embodiment, the signing algorithm can be based on mechanism for message authentication using a cryptographic or other function to generate a code as a function of the principal and a secret, shared key. A change to the principal can thus be detected if the function is applied again, but the resulting value no longer matches the originally computed code.

In one embodiment, the signing function can be implemented using an HMAC hashing-based algorithm. Assume that H denotes a hash function that takes an input string of any length and produces a hashed output. Let Text denote information about the principal to be signed (e.g., the name of the principal, etc.), and let K denote a secret key. K should not be larger than the size of the hashing block size as determined by H (e.g., 64). If K is shorter than the block size, it should be extended by zeroes until it equals the block size. Let ipad represent the byte 0x36 repeated 64 times, and opad represent the byte 0x5C repeated 64 times. Thus, in one embodiment, the authentication code can be calculated as follows:

$$HMAC_k(Text)=H(K \oplus opad, H(K \oplus ipad, Text)).$$

First, K and ipad are XOR'd (bitwise exclusive-OR) together. H is applied to this result as prepended to Text. The output of H is then appended to the XOR of K and opad. This result is then passed to a second invocation of H to produce the authentication code.

Because some LoginModules can be remotely executed on behalf of RMI client, and because the client application code can retain the authenticated subject between programmatic server invocations, Authentication providers rely on Principal Validation providers to provide additional security protections for the principals contained within the subject. The Principal Validation providers provide these additional security protections by signing and verifying the authenticity of the principals. This principal validation provides an additional level of trust and may reduce the likelihood of malicious principal tampering. In one embodiment, verification of principal signatures takes place during the WebLogic® Server's demarshalling of remote method invocation client requests for each invocation. The authenticity of the subject's principals can also be verified when making authorization decisions, such as when a client is attempting to access a resource.

The PrincipalValidator interface 208 defines the methods that Principal Validation providers can implement to support principal trust relationships within the context of the WebLogic® Server environment. In one embodiment, a PrincipalValidator's methods can include:

| METHOD | DESCRIPTION |
|---|---|
| validate (Principal) | Verifies that the principal has not been altered since it was signed. Returns TRUE if the principal has been validated or FALSE if the principal has not been validated. |
| sign (String) | Signs the principal to assure trust. Returns TRUE if the principal has been signed, FALSE if the principal has not been signed. The sign method should be a secret algorithm that malicious individuals cannot easily recreate. It can include an algorithm within the sign method itself, have the sign method call out to a server for a token it should use to sign the principal, or implement some other way of signing the principal. |
| getPrincipal-BaseClass | Gets the base Principal class validated and signed by this Principal Validation provider. |

Figure 5:
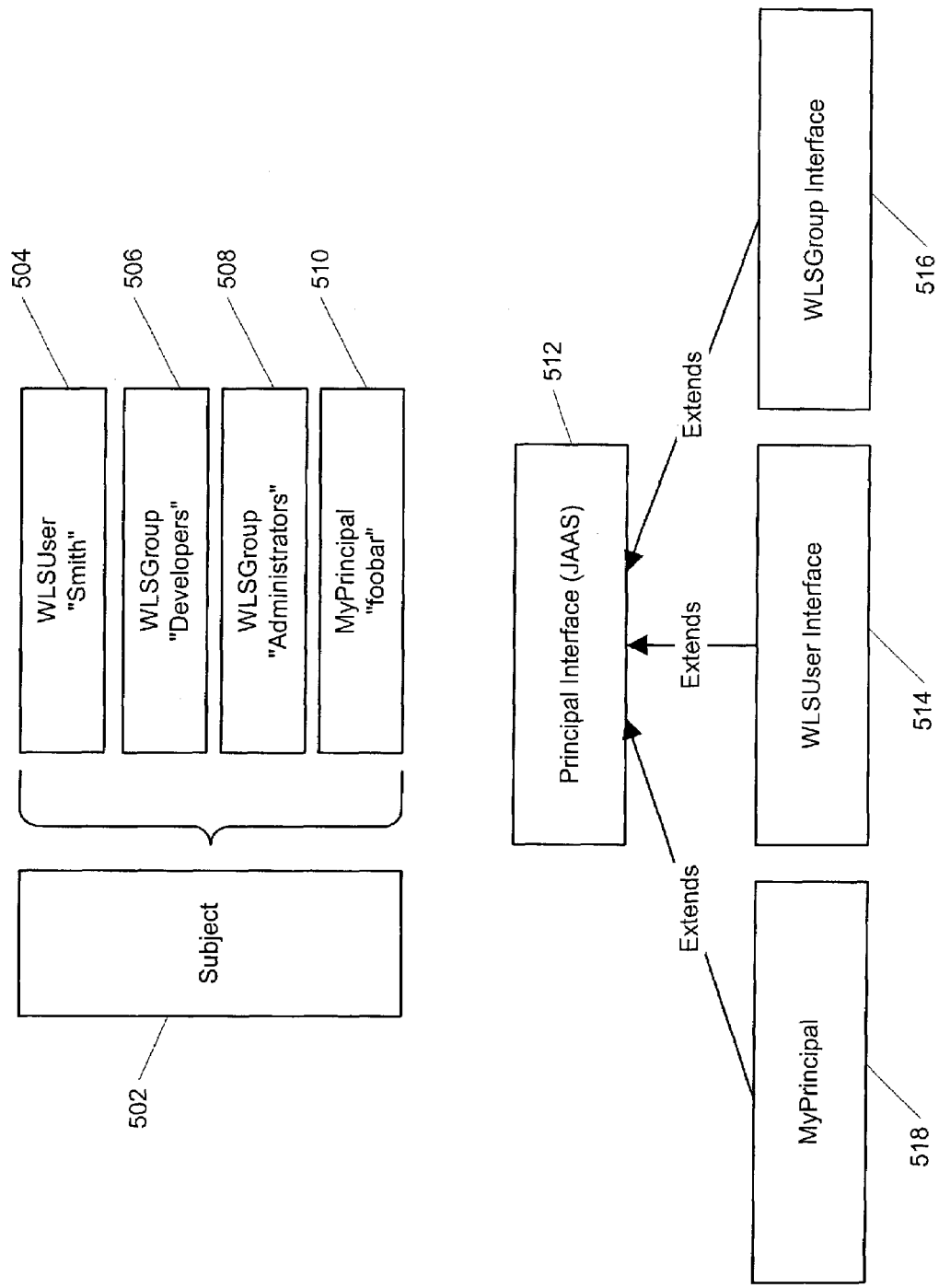
FIG. 5 illustrates relationships among users, groups, principals and subjects in one embodiment of the invention.

FIG. 5 illustrates relationships among users, groups, principals and subjects in one embodiment of the invention. A subject 502 can have multiple identities, each of which is represented by a principal 504-510. In one embodiment, a principal that is going to represent a user or a group can implement the WLSUser interface 514 or WLSGroup 516 interfaces, respectively. In one embodiment, these interfaces can be marker interfaces, that is they can extend the JASS Principal interface 512 without adding any methods. In another embodiment, the Principal interface 512 can be extended by custom interfaces (e.g., MyPrincipal 518). Referring to FIG. 5, principal "Smith" 504 is an instance of WLSUser 514, "Developers" 506 and "Administrators" 508 are instances of WLSGroup 516, and "foobar" 510 is an instance of MyPrincipal 518.

A JAAS-compliant LoginModule 302 is a component of a WLSS authentication provider. LoginModules authenticate subjects within a security realm and populate them with principals. In one embodiment, LoginModules can also verify the proof material submitted (e.g., a user's password). If there are multiple authentication providers configured in a security realm, each authentication provider's LoginModule will store principals within the same subject. Therefore, if a principal that represents a WebLogic® Server user (e.g., an implementation of the WLSUser interface) named "Joe" is added to the subject by one authentication provider's LoginModule, any other authentication provider in the security realm should be referring to the same person when they encounter "Joe". However, it is acceptable for a another authentication provider's LoginModule to add a principal of a type other than WLSUser with the name "Joe".

LoginModules can be written to handle a variety of authentication mechanisms, including username/password combinations, smart cards, biometric devices, and so on. In one embodiment, a LoginModule can implement the javax.security.auth.spi.LoginModule interface, which is based on JAAS and uses a subject as a container for authentication information. The LoginModule interface enables different kinds of authentication technologies for use with a single application, and the WLSS framework is designed to support multiple LoginModule implementations for multipart authentication. In one embodiment, the relationship between LoginModules and Authentication providers is one-to-one. In other words, to have a LoginModule that handles retina scan authentication and a LoginModule that interfaces to a hardware device like a smart card, two Authentication providers are required, each of which includes an implementation of the LoginModule interface.

Figure 6:
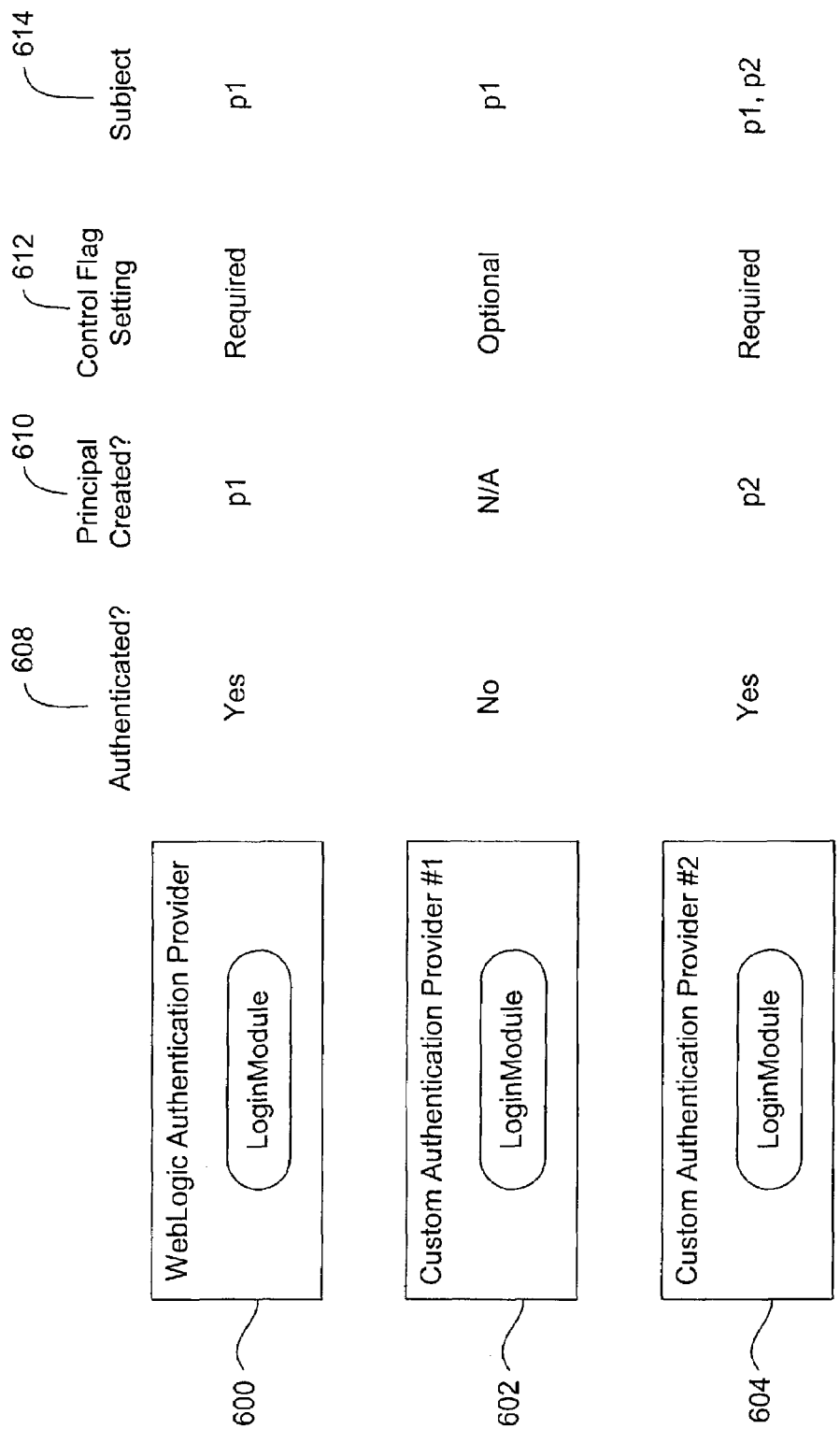
FIG. 6 is an illustration of how a configuration can affect a stacked authentication in one embodiment of the invention.

FIG. 6 is an illustration of how a configuration can affect a stacked authentication in one embodiment of the invention. Multiple authentication providers 600-604 are illustrated with associated configuration information in columns 608-614. The "Authenticated?" column 608 indicates whether or not the authentication in this instance succeeded. The "Principal Created?" column 610 indicates whether or not a principal was associated with the subject as a result of authentication. The "Control Flag Setting" column 612 indicates the control flag configuration setting for the corresponding authentication module. Finally, the "Subject" column 614 indicates which principals are associated with the subject as a result of the authentication.

Looking at authentication provider 600, its authentication succeeded as indicated by the "Yes" in column 608. Therefore, a principal p1 was created as shown in column 610. The principal p1 is associated with the subject, as indicated in column 614. This authentication provider's configuration control flag was set to "Required", as indicated in column 612. The authentication performed by authentication provider 602 failed, as indicated by the "No" in column 608. Thus, p1 remains in the subject. Since the control flag setting is "Optional", authentication will nonetheless proceed to the next provider in the stack. If the control flag for authentication provider 602 had been set to "Required", however, the failure would have caused the entire process to fail. Also, if the subject had not been authenticated by the provider 600 or 602, the entire authentication process would have failed. If the authentication process had failed in any of these ways, all three LoginModule authentications would have been rolled back and the subject would not contain any principals. Authentication provider 604 had a successful authentication, and thus principal p2 is also added to the subject.

Figure 7:
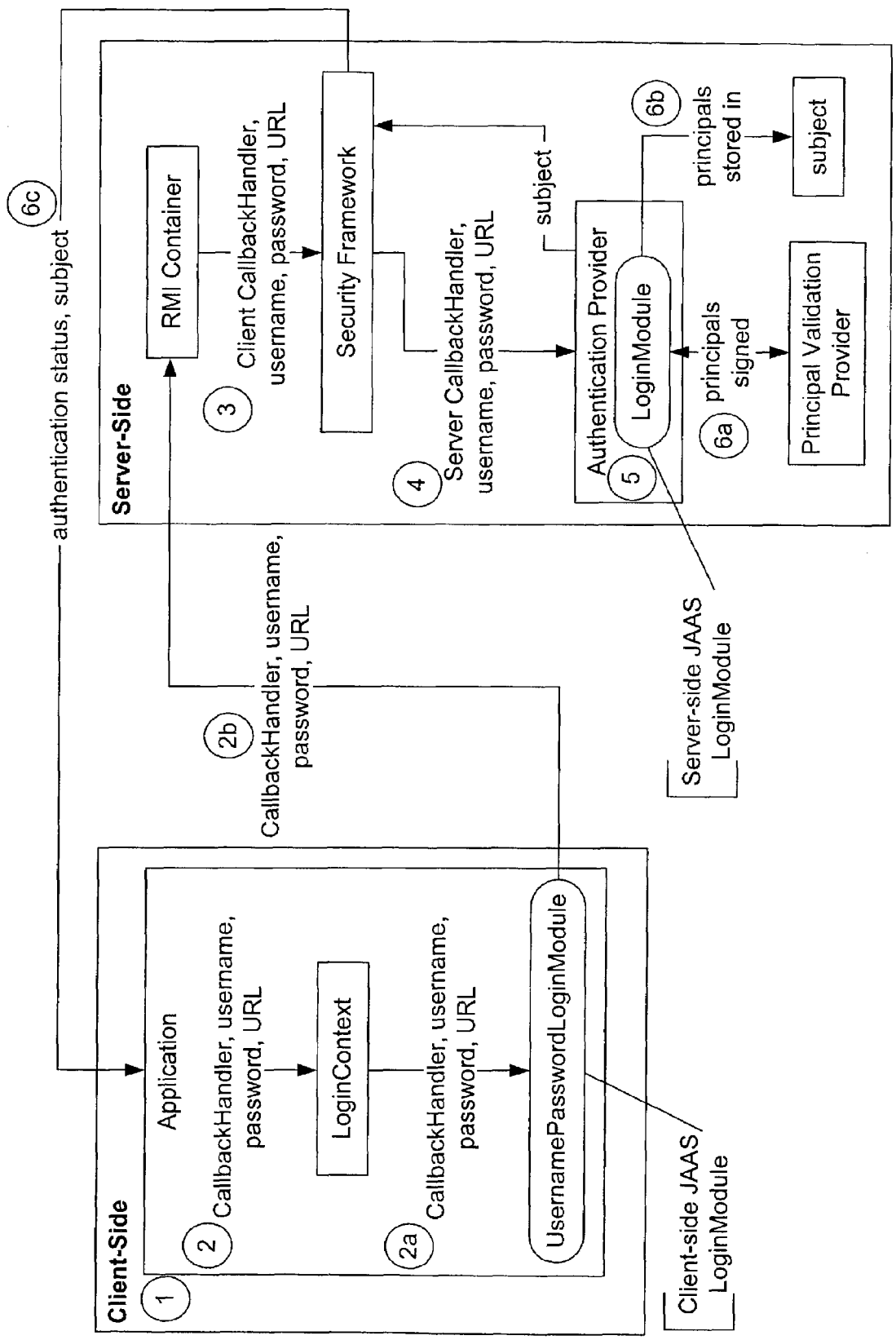
FIG. 7 illustrates how the Java™ Authentication and Authorization Service interacts with the WebLogic® Server in one embodiment of the invention.

FIG. 7 illustrates how the Java™ Authentication and Authorization Service interacts with the WebLogic® Server in one embodiment of the invention. In another embodiment, for authentication performed entirely on the server-side, the process would begin at step 3.

1. A client-side application obtains authentication information from a user or process (e.g., user name, password and uniform resource locator). The mechanism by which this occurs can be different for each type of client.
2. The application creates a CallbackHandler containing the authentication information. In one embodiment, there are three types of CallbackHandlers: NameCallback, PasswordCallback, and TextInputCallback, all of which can reside in the javax.security.auth.callback package. The NameCallback and PasswordCallback return the username and password, respectively. TextInputCallback can be used to access the data users enter into any additional fields on a login form (that is, fields other than those for obtaining the username and password).
   a. The application passes the CallbackHandler to the LoginModule using the LoginContext class.
   b. The client's LoginModule passes the CallbackHandler containing the authentication information (that is, username, password, and URL) to a WebLogic® Server Remote Method Invocation (RMI) container.
3. The WebLogic® Server remote method invocation (RMI) container calls into the WLSS framework. The client-side CallbackHandler containing authentication information is provided to the WLSS framework.
4. In one embodiment, for each of the configured authentication providers the WLSS framework creates a CallbackHandler containing the username, password, and URL that was passed in. (In one embodiment, these are internal CallbackHandlers created on the server-side by the framework, and are not related to the client's CallbackHandler.)
5. The framework calls the LoginModule associated with the Authentication provider (i.e., the LoginModule that is specifically designed to handle the authentication information). The LoginModule attempts to authenticate the client using the authentication information.
6. If the authentication is successful, the following occurs:
   a. Principals (users and groups) are signed by a principal validation provider to ensure their authenticity between programmatic server invocations.
   b. The LoginModule associates the signed principals with a subject, which represents the user or system being authenticated.
   c. The framework returns an authentication status to the client application, and the client application retrieves the authenticated subject from the framework.

One embodiment may be implemented using a conventional general purpose or a specialized digital computer or microprocessor(s) programmed according to the teachings of the present disclosure, as will be apparent to those skilled in the computer art. Appropriate software coding can readily be prepared by skilled programmers based on the teachings of the present disclosure, as will be apparent to those skilled in the software art. The invention may also be implemented by the preparation of integrated circuits or by interconnecting an appropriate network of conventional component circuits, as will be readily apparent to those skilled in the art.

One embodiment includes a computer program product which is a computer readable storage medium (media) having instructions stored thereon/in which can be used to program a computer to perform any of the features presented herein. The computer readable storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

Stored on any one of the computer readable storage medium (media), the present invention includes software for controlling both the hardware of the general purpose/specialized computer or microprocessor, and for enabling the computer or microprocessor to interact with a human user or other mechanism utilizing the results of the present invention. Such software may include, but is not limited to, device drivers, operating systems, execution environments/containers, and user applications.

The foregoing description of the preferred embodiments of the present invention has been provided for the purposes of illustration and description. It is not intended to be exhaustive or to limit the invention to the precise forms disclosed. Many modifications and variations will be apparent to the practitioner skilled in the art. Embodiments were chosen and described in order to best describe the principles of the invention and its practical application, thereby enabling others skilled in the art to understand the invention, the various embodiments and with various modifications that are suited to the particular use contemplated. It is intended that the scope of the invention be defined by the following claims and their equivalents.

What is claimed is:

1. A method for authenticating a subject based on authentication information, comprising the steps of:
   providing a front-end application programming interface (API), a back-end service provider interface (SPI), and a configuration file, wherein a client application accesses authentication services via the front-end API, wherein a set of authentication providers write to the back-end SPI, and wherein the configuration file specifies one or more authentication providers to perform authentication for the client application;
   receiving authentication information containing a user name and password associated with the subject by the client application;
   initiating a stacked login sequence including the one or more authentication providers specified in the configuration file to authenticate said subject, each authentication provider having a control flag that indicates whether said authentication provider is one of: required, requisite, optional and sufficient in said stacked login sequence;
   generating a callback handler containing the authentication information by said client application;
   passing the callback handler to a remote method invocation (RMI) container of a server;
   providing the callback handler by the RMI container to a security service framework of the server wherein the security service framework creates an internal callback handler for each authentication provider in the stacked login sequence and invokes said each authentication provider;
   performing, by each said authentication provider, authentication of the subject based on the authentication information contained in the internal callback handler, wherein successful authentication of the subject results in creating a principal for the subject, the principal providing an identity for the subject that has been authenticated;
   ensuring the authenticity of the principal between programmatic server invocations by signing the principal that has been created during successful authentication, wherein signing is performed by including an algorithm within a sign method or by having the sign method call out to the server for a token containing a keV that is used to sign said principal, wherein an authentication code is determined for the principal that is a function of the principal and the key;
   storing the principal that has been signed into the subject that has been authenticated;
   reading said control flag of said authentication provider in order to determine whether to proceed with said stacked login sequence and invoke a next authentication provider in said stacked login sequence;
   receiving a programmatic server invocation from the client application a period of time after the stacked login sequence completes; and
   determining whether the principal was tampered with between a time of associating the principal with the subject and receiving the programmatic server invocation, wherein determining includes generating a second code and comparing the second code to the authentication code which was originally computed upon signing the principal, wherein a change to the principal is detected based on the signing.

2. The method of claim 1 wherein:
   the authentication code is generated via a secret key authentication algorithm.

3. The method of claim 1 wherein:
   the authentication information is received from a client and wherein the subject is passed back to the client after storing the principal.

4. The method of claim 1 wherein:
   the step of performing authentication of the subject includes invoking one or more authentication mechanisms.

5. The method of claim 1 wherein:
   the step of performing authentication of the subject includes invoking one or more login modules.

6. The method of claim 1 wherein:
   the step of performing authentication of the subject is within the context of a security realm.

7. The method of claim 1 wherein: the authentication information further includes biometric data.

8. The method of claim 7 wherein:
   the biometric data can include includes at least one of (1) a finger print, (2) a voice print, (3) a retina scan, (4) an image, (5) a sound, (6) a sample of human deoxyribonucleic acid, (7) human saliva, and (8) human blood.

9. The method of claim 1 wherein for each of said authentication providers, an internal server-side callback handler is generated, said callback handler containing the user name, password and uniform resource locator (URL) that was passed in.

10. The method of claim 1 wherein the method implements management extensions architecture by exposing managed resources through one or more managed beans.

11. A system comprising at least one processor and a computer readable storage medium having one or more sequences of instructions that are executed by the processor causing the processor to implement:
    a front-end application programming interface (API), a back-end service provider interface (SPI), and a configuration file, wherein a client application accesses authentication services via the front-end API, wherein a set of authentication providers write to the back-end SPI, and wherein the configuration file specifies one or more authentication providers to perform authentication for the client application;
    an authentication stack containing the set of authentication providers coupled to the framework, each authentication provider having a control flag that indicates whether said each authentication provider is at least one of: required, requisite, sufficient and optional in said authentication stack;
    a remote method invocation (RMI) container of a server that receives a callback handler from a client application;
    a security framework that receives the callback handler from the RMI container, creates an internal callback handler for each authentication provider in the stacked login sequence and invokes said each authentication provider;
    login module coupled to the authentication provider, the login module authenticating the subject based on authentication information contained in the internal callback handler, wherein the login module creates a principal for the subject if authentication of the subject is successful, the principal providing an identity for the subject that has been authenticated; and
    a principal validator coupled to the authentication provider, wherein the principal validator ensures the authenticity of the principal between programmatic server invocations by signing the principal that has been created during successful authentication, wherein signing is performed by including an algorithm within a sign method or by having the sign method call out to the server for a token containing a key that is used to sign said principal, wherein an authentication code is determined for the principal that is a function of the principal and the key and wherein the signed principal is thereafter stored into the subject, embodied in a computer readable medium; and wherein the server receives a programmatic server invocation from the client application a period of time after the stacked login sequence completes, and determines whether the principal has been altered between a time of associating the principal with the subject and receiving the programmatic server invocation, wherein determining includes generating a second code and comparing the second code to the authentication code previously computed during signing the principal, wherein a change to the principal is detected based on the signing.

12. The system of claim 11 wherein:
the authentication code is generated via a secret key authentication algorithm.

13. The system of claim 11 wherein:
the authentication information is received from a client and wherein the subject is passed back to the client after storing the principal.

14. The system of claim 11 wherein:
more than one login modules are employed.

15. The system of claim 11 wherein:
the login modules coupled with the authentication provider are within the context of a security realm.

16. The system of claim 11 wherein: the authentication information further includes biometric data.

17. The system of claim 16 wherein:
the biometric data includes at least one of (1) a finger print, (2) a voice print, (3) a retina scan, (4) an image, (5) a sound, (6) a sample of human deoxyribonucleic acid, (7) human saliva, and (8) human blood.

18. A computer readable storage medium having instructions stored thereon that when executed by a processor cause a system to:
provide a front-end application programming interface (API), a back-end service provider interface (SPI), and a configuration file, wherein a client application accesses authentication services via the front-end API, and wherein a set of authentication providers write to the back-end SPI, and wherein the configuration file specifies one or more authentication providers to perform authentication for the client application;
receive authentication information containing a user name and password associated with the subject by the client application;
initiate a stacked login sequence including the one or more authentication providers specified in the configuration file to authenticate said subject, each authentication provider having a control flag that indicates whether said authentication provider is one of: required, requisite, optional and sufficient in said stacked login sequence;
generate a callback handler containing the authentication information by said client application;
provide the callback handler, by the RMI container to a security service framework of the server wherein the security service framework creates an internal callback handler for each authentication provider in the stacked login sequence and invokes said each authentication provider;
perform authentication of the subject based on the authentication information contained in the internal callback handler, wherein successful authentication of the subject results in creating a principal for the subject, the principal providing an identity for the subject that has been authenticated;
ensure the authenticity of the principal between programmatic server invocations by signing the principal that has been created during successful authentication, wherein signing is performed by including an algorithm within a sign method or by having the sign method call out to the server for a token containing a key that is used to sign said principal, wherein an authentication code is determined for the principal that is a function of the principal and the key;
store the principal that has been signed into the subject that has been authenticated;
read said control flag of said authentication provider in order to determine whether to proceed with said stacked login sequence;
receive a programmatic server invocation from the client application a period of time after the stacked login sequence completes; and
determine whether the principal was tampered with between a time of associating the principal with the subject and receiving the programmatic server invocation, wherein determining includes generating a second code and comparing the second code to the authentication code which was originally computed upon signing the principal, wherein a change to the principal is detected based on the signing.

19. The computer readable storage medium of claim 18 wherein:
the authentication code is generated via a secret key authentication algorithm.

20. The computer readable storage medium of claim 18 wherein:
the authentication information is received from a client and wherein the subject is passed back to the client after storing the principal.

21. The computer readable storage medium of claim 18 wherein:
the authentication of the subject includes invoking one or more authentication mechanisms.

22. The computer readable storage medium of claim 18 wherein:
the authentication of the subject includes invoking one or more login modules.

23. The computer readable storage medium of claim 18 wherein:
the authentication of the subject is within the context of a security realm.

24. The computer readable storage medium of claim 18 wherein: the authentication information further includes biometric data.

25. The computer readable storage medium of claim 24 wherein:
the biometric data includes at least one of (1) a finger print, (2) a voice print, (3) a retina scan, (4) an image, (5) a sound, (6) a sample of human deoxyribonucleic acid, (7) human saliva, and (8) human blood.

* * * * *

UNITED STATES PATENT AND TRADEMARK OFFICE
CERTIFICATE OF CORRECTION

PATENT NO. : 7,610,618 B2
APPLICATION NO. : 10/373533
DATED : October 27, 2009
INVENTOR(S) : Paul Patrick It is certified that error appears in the above-identified patent and that said Letters Patent is hereby corrected as shown below:

In column 5, line 26-27, delete "Authenticationimp" and insert -- AuthenticationImp --, therefor.

In column 5, line 29, delete "Authenticationimp" and insert -- AuthenticationImp --, therefor.

In column 5, line 37, delete "Authenticationimp" and insert -- AuthenticationImp --, therefor.

In column 6, line 48, after "other" delete "Authenticaion" and insert -- Authentication --, therefor.

In column 7, line 18, delete "Authenticationimp" and insert -- AuthenticationImp --, therefor.

In column 7, line 47, delete " $HMAC_K(Text)=H(K\overline{x})opad,H(K\overline{x})ipad,Text))$. " and insert -- $HMAC_t(Text) = H(K \otimes opad, H(K \otimes ipad, Text))$. --, therefor.

In column 11, line 29-30, in claim 1, delete "providing the callback handler by the RMI container to a security service framework of the server" and insert -- providing the callback handler, by the RMI container, to a security service framework of the server, --, therefor.

In column 11, line 47, in claim 1, delete "KeV" and insert -- Key --, therefor.

In column 12, line 21, in claim 8, after "data" delete "can include".

In column 12, line 35, in claim 11, after "processor" insert -- , --.

In column 12, line 59, in claim 11, before "login" insert -- a --.

In column 13, line 62, in claim 18, after "application," insert, on a new line, -- pass the callback handler to a remote method invocation (RMI) container of a server, --.

In column 13, line 64, in claim 18, after "container" insert -- , --.

Signed and Sealed this

Thirty-first Day of August, 2010

David J. Kappos
*Director of the United States Patent and Trademark Office*

CERTIFICATE OF CORRECTION (continued)
U.S. Pat. No. 7,610,618 B2

In column 13, line 65, in claim 18, after "server" insert -- , --.